United States Patent
Li et al.

(10) Patent No.: US 8,790,006 B2
(45) Date of Patent: Jul. 29, 2014

(54) MULTIWAVELENGTH THERMOMETER

(75) Inventors: Hejie Li, Clifton Park, NY (US);
Rodrick Gordon Brown, Nottingham (GB); Lesley Ellen Brown, legal representative, Nottingham (GB);
Samhita Dasgupta, Niskayuna, NY (US); Edward Randall Furlong, Beverly, MA (US); Nirm Velumylum Nirmalan, Niskayuna, NY (US);
Anquan Wang, Clifton Park, NY (US);
Guanghua Wang, Clifton Park, NY (US); Stephen Thomas Walls, Leicestershire (GB)

(73) Assignee: General Electric Company, Niskayuna, NY (US)

( * ) Notice: Subject to any disclaimer, the term of this patent is extended or adjusted under 35 U.S.C. 154(b) by 931 days.

(21) Appl. No.: 12/627,293

(22) Filed: Nov. 30, 2009

(65) Prior Publication Data
US 2011/0128989 A1    Jun. 2, 2011

(51) Int. Cl.
G01J 5/00    (2006.01)
G01K 1/14    (2006.01)
G01K 11/00    (2006.01)

(52) U.S. Cl.
USPC ........... 374/130; 374/120; 374/161; 374/144; 374/148; 374/166

(58) Field of Classification Search
USPC ................ 374/130, 120, 161, 144, 166, 148
See application file for complete search history.

(56) References Cited

U.S. PATENT DOCUMENTS

| | | | |
|---|---|---|---|
| 2,844,032 A | 7/1958 | Tandler et al. |
| 3,537,795 A | 11/1970 | Clerc |
| 3,696,678 A | 10/1972 | Mossey |
| 4,118,985 A | 10/1978 | Compton |
| 4,142,417 A | 3/1979 | Cashdollar et al. |
| 4,204,744 A | 5/1980 | Wittmann |
| 4,239,330 A | 12/1980 | Ashkin et al. |
| 4,326,798 A | 4/1982 | Kahn |
| 4,378,144 A | 3/1983 | Duck et al. |
| 4,411,519 A | 10/1983 | Tagami |
| 4,441,785 A | 4/1984 | Petrozello |

(Continued)

FOREIGN PATENT DOCUMENTS

| | | |
|---|---|---|
| DE | 102005036525 B3 | 11/2006 |
| EP | 0173548 A2 | 3/1986 |

(Continued)

OTHER PUBLICATIONS

Search Report from corresponding EP Application No. 10192471.0-2217 dated Aug. 3, 2011.

(Continued)

*Primary Examiner* — Mirellys Jagan
(74) *Attorney, Agent, or Firm* — Joseph J. Christian

(57) ABSTRACT

A thermal measurement system that includes a light collection device and a detection system in communication with the device. The detection system includes two detection subsystems, wherein one subsystem is configured to detect light from a surface of an object, while the other subsystem is configured to detect light from the surface and a gas. The present invention has been described in terms of specific embodiment(s), and it is recognized that equivalents, alternatives, and modifications, aside from those expressly stated, are possible and within the scope of the appending claims.

15 Claims, 9 Drawing Sheets

(56) References Cited

U.S. PATENT DOCUMENTS

| | | |
|---|---|---|
| 4,568,183 A | 2/1986 | Douglas |
| 4,579,461 A | 4/1986 | Rudolph |
| 4,582,426 A | 4/1986 | Douglas |
| 4,648,711 A | 3/1987 | Zachary |
| 4,657,386 A | 4/1987 | Suarez-Gonzalez et al. |
| 4,666,297 A | 5/1987 | Suarez-Gonzalez |
| 4,681,434 A | 7/1987 | Kepple |
| 4,708,474 A | 11/1987 | Suarez-Gonzalez |
| 4,753,501 A | 6/1988 | Battle |
| 4,779,977 A | 10/1988 | Rowland et al. |
| 4,790,669 A | 12/1988 | Christensen |
| 4,799,787 A | 1/1989 | Mason |
| 4,814,870 A | 3/1989 | Crall |
| 4,896,935 A | 1/1990 | Lee |
| 4,907,895 A | 3/1990 | Everest |
| 4,942,294 A | 7/1990 | Witte |
| 4,970,670 A | 11/1990 | Twerdochlib |
| RE33,857 E * | 3/1992 | Ariessohn et al. ............ 348/164 |
| 5,123,751 A | 6/1992 | Baker |
| 5,125,739 A | 6/1992 | Suarez-Gonzalez et al. |
| 5,132,922 A | 7/1992 | Khan et al. |
| 5,149,959 A | 9/1992 | Collins et al. |
| 5,211,478 A | 5/1993 | Horsley |
| 5,226,731 A | 7/1993 | Allen |
| 5,265,036 A | 11/1993 | Suarez-Gonzalez et al. |
| 5,292,196 A | 3/1994 | Iida et al. |
| 5,348,396 A | 9/1994 | O'Rourke et al. |
| 5,408,550 A | 4/1995 | Lefevre et al. |
| 5,421,652 A | 6/1995 | Kast et al. |
| 5,507,576 A | 4/1996 | Fally |
| 5,664,034 A | 9/1997 | Mock |
| 5,755,510 A | 5/1998 | Hernandez et al. |
| 5,797,682 A | 8/1998 | Kert et al. |
| 5,803,607 A * | 9/1998 | Jones et al. .................. 374/161 |
| 6,031,947 A | 2/2000 | Laor |
| 6,109,783 A | 8/2000 | Dobler et al. |
| 6,121,616 A | 9/2000 | Trigg |
| 6,422,745 B1 | 7/2002 | Glasheen et al. |
| 6,513,971 B2 | 2/2003 | Tubbs |
| 6,539,132 B2 | 3/2003 | Ivtsenkov et al. |
| 6,698,920 B1 | 3/2004 | Maylotte et al. |
| 6,726,761 B2 | 4/2004 | Hodgkinson et al. |
| 6,786,635 B2 | 9/2004 | Choi |
| 6,796,709 B2 | 9/2004 | Choi |
| 6,992,315 B2 | 1/2006 | Twerdochlib |
| 7,003,425 B2 | 2/2006 | Bird et al. |
| 7,064,811 B2 | 6/2006 | Twerdochlib |
| 7,140,186 B2 | 11/2006 | Venkateswaran et al. |
| 7,633,066 B2 | 12/2009 | Antel, Jr. et al. |
| 2003/0127602 A1 | 7/2003 | Harrold et al. |
| 2004/0179575 A1 | 9/2004 | Markham |
| 2006/0088793 A1 | 4/2006 | Brummel et al. |
| 2006/0180760 A1 | 8/2006 | Lane et al. |
| 2008/0095212 A1 | 4/2008 | Jonnalagadda et al. |
| 2008/0288182 A1 | 11/2008 | Cline et al. |
| 2008/0289342 A1 | 11/2008 | Sappey et al. |
| 2009/0002684 A1 * | 1/2009 | Sanders .......................... 356/51 |

FOREIGN PATENT DOCUMENTS

| | | |
|---|---|---|
| EP | 0379192 | 7/1990 |
| JP | 5642118 A | 4/1981 |
| JP | 3077030 | 4/1991 |
| WO | 2005050163 | 6/2005 |
| WO | 2007014960 | 2/2007 |
| WO | 2007041670 A1 | 4/2007 |

OTHER PUBLICATIONS

P. Zombo et al., "On-Line Monitor—High speed Infrared Images of Operating Turbine Blades," Siemens Power Generation, Propulsion Safety and Affordable Readiness Program Review, Mar. 28-30, 2006, 14 Slides.

JP3077030, Japanese Abstract, Apr. 2, 1991.

R. S. Bunker et al., "System and Method for Thermal Inspection of Parts," U.S. Appl. No. 11/775,502, filed Jul. 10, 2007.

J. R. Allen et al., "Online system and Methods for Thermal Inspection of Parts," U.S. Appl. No. 11/842,219, filed Aug. 21, 2007.

J. R. Allen et al., "System and Method for Thermal Inspection of Objects," U.S. Appl. No. 12/120,617, filed May 14, 2008.

Japanese Office Action issued in connection with corresponding JP Application No. 2010-260748 on Apr. 22, 2014.

* cited by examiner

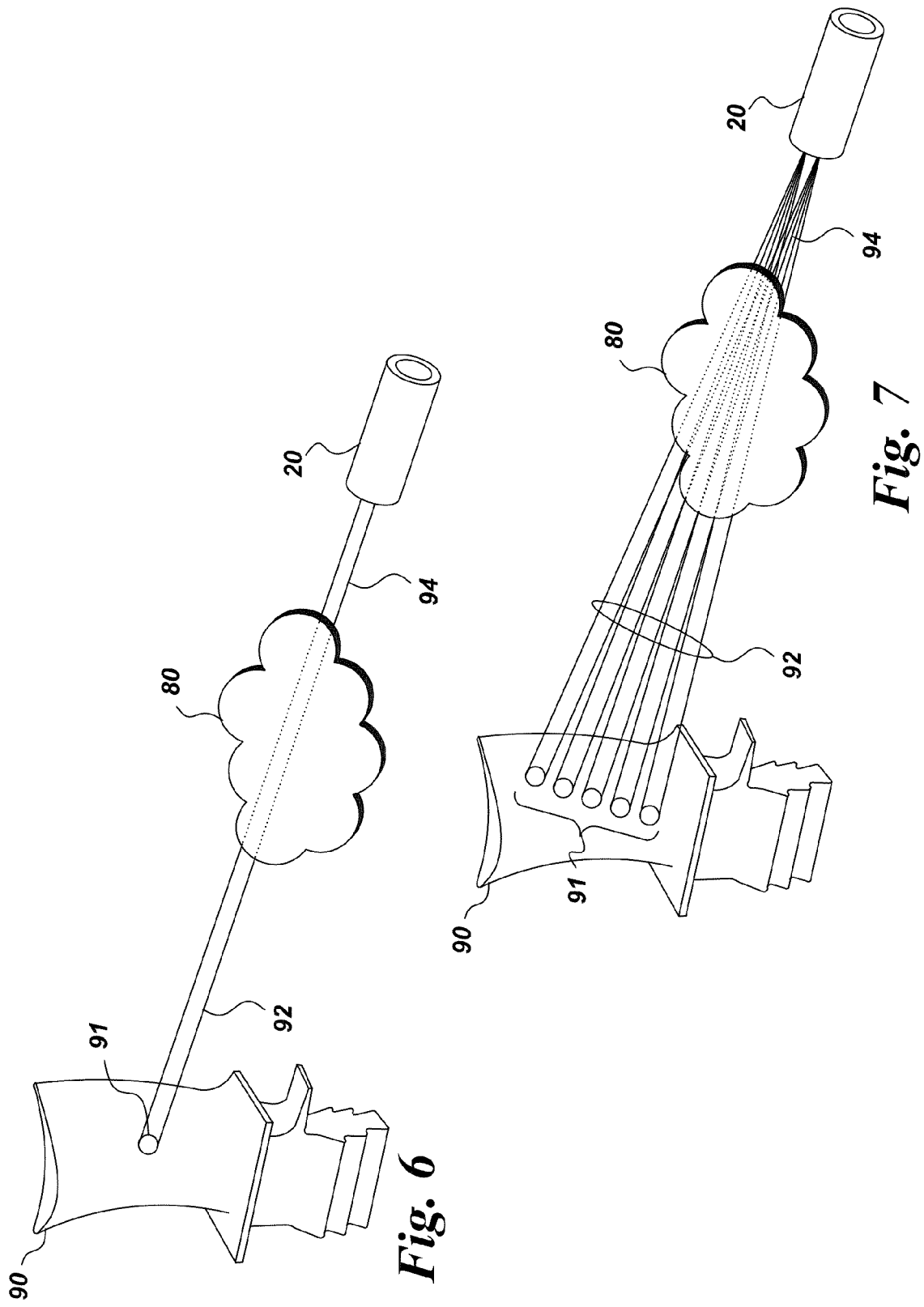

MULTIWAVELENGTH THERMOMETER

CROSS-REFERENCE TO RELATED APPLICATIONS

This application is related in some aspects to commonly owned patent application Ser. No. 11/438,604, entitled MULTIWAVELENGTH PYROMETRY SYSTEMS", filed on May 22, 2006, the entire contents of which are herein incorporated by reference.

BACKGROUND OF THE INVENTION

The invention relates generally to thermal measurement systems, and more particularly to a multiwavelength thermometer.

Current approaches to measuring temperatures of the actual components in high temperature and/or high pressure environments have drawbacks.

One approach to monitoring hot component temperatures is to indirectly measure the temperature of the gas leaving an engine and to use this as an indication of the component temperature. However, indirect temperature measurement techniques are relatively inaccurate, and approaches for measuring component temperatures directly have been proposed.

Another approach to measuring absolute temperatures of component parts is through the use of thermocouples. Temperature measurement in these types of harsh environments, however, is limited due to uncertain radiation loss and the short lifetime of thermocouples due to their intrusiveness into the actual component and/or gas environment. Additionally, these intrusive measurement methods only provide temperature information at a single point, which is of limited use for operations such as gas turbine operations.

Pyrometers, also referred to as infrared thermometers, provide non-contact temperature measurements of an object and have been used to estimate temperatures of objects in a variety of industrial, scientific, and commercial processes. One of the techniques in pyrometry that has been used is multi-wavelength pyrometry. In this technique, absolute temperature of an object is determined by sampling and combining radiation emitted by the object at multiple wavelengths.

Another technique for measuring temperature in this type of environment is to use lasers. While lasers may offer the benefit of accuracy, they too suffer from their own shortcomings, namely high cost, increased sensitivity, and a continual need for retuning. Additionally, none of these techniques are able to simultaneously measure temperatures of the gaseous environments that these components often reside in.

Another complicating factor for measuring temperatures in certain harsh environments is that in certain combustion regions (e.g., aircraft engines) adding devices of any sort in the combustion region is highly regulated. For example, the FAA restricts what devices, parts, and the like may be located with the turbine region. So, while passive measurement of temperature may be more desirable in addressing the regulatory restrictions, it has limitations technically.

Therefore, there is an ongoing need for improvements in temperature measurement, especially in harsh environments.

BRIEF DESCRIPTION

The present invention overcomes at least some of the aforementioned drawbacks by providing an improved multiwavelength thermometer. More specifically, aspects of the present invention provide for a thermal measurement system, a method of directly measuring temperatures, a computer program product for measuring temperatures, and a method of deploying an application for measuring temperatures.

Therefore, in accordance with one aspect of the invention, a thermal measurement system comprises a light collection device; a detection system in communication with the light collection device, the detection system comprising a first detection subsystem and a second detection subsystem, wherein the first detection subsystem is configured to detect light from a surface of an object, further wherein the second detection subsystem is configured to detect light from the surface and a gas.

In accordance with another aspect of the invention, a thermal measurement system comprises a light collection device; and a detection system in communication with the light collection device, wherein the detection system is configured to detect light intensity from a gas.

In accordance with another aspect of the invention, a method of directly measuring temperatures comprises collecting light through a gas from a surface of an object; one of receiving and measuring a temperature of the surface of the object; and measuring a temperature of the gas, based on the collected light and the temperature of the surface of the object.

In accordance with another aspect of the invention, a method of directly measuring a temperature comprises collecting light from a gas; and measuring the temperature of the gas, based on the collected light.

In accordance with another aspect of the invention, a computer program product stored on a computer readable medium for measuring temperatures, the computer readable medium comprising program code for performing the steps of: collecting light through a gas from a surface of an object; one of receiving and measuring a temperature of a surface of an object; and measuring a temperature of the gas, based on the light and the temperature.

In accordance with another aspect of the invention, a method of deploying an application for measuring temperatures, comprises: providing a computer infrastructure being operable to: collect light through a gas from a surface of an object; one of receive and measure a temperature of a surface of an object; and measure a temperature of the gas, based on the light and the temperature.

Various other features and advantages of the present invention will be made apparent from the following detailed description and the drawings.

BRIEF DESCRIPTION OF THE DRAWINGS

The drawings illustrate one embodiment presently contemplated for carrying out the invention.

FIG. 6 is a perspective view of a single point optical system portion of an embodiment of the present invention.

FIG. 7 is a perspective view of a one-dimensional array optical system portion of an embodiment of the present invention.

DETAILED DESCRIPTION

As discussed in detail herein, embodiments of the present invention include an improved thermal measurement system (or an improved multi-wavelength thermometer) that provides a non-contact means for measuring temperatures (typically high temperatures) of a gas and of an object (often concurrently) by sampling wavelengths (often multiple wavelengths) of emitted light from the surface of the object that passes through the gas unimpeded (i.e., little or not absorption) while additionally sampling wavelengths of light that is partially absorbed by the gas and reemitted with a signature based on the gas it has passed through. In other embodiments, the thermal measurement system is able to measure the temperature of the gas, while the temperature of the object surface is provided by other means (e.g., from database). Thus, aspects of the invention can provide realtime surface and gas temperatures simultaneously during engine operation.

This passive absorption spectroscopy method offers benefits in that it passively uses the hot surface of the object as an emitter (vs. using a laser) and may employ available borescope ports to use a light collection probe to detect light emissions. The accurate temperature information obtained will aid monitoring and validating of performance (e.g., blade/bucket performance) as well as aid in optimizing combustor performance.

Ultimately, aspects of the invention may be used as, for example, as a product offering (e.g., with a turbine, with an aircraft engine, etc.), a standalone product, a service offering, and/or a component of a service offering. Both steady-state temperature date and transient temperature data may be obtained and used to track and measure local combustor performance and component health. Aspects of the invention may even be remote from the actual gas and object. For example, a computer system that employs aspects of the invention may be in a remote location, on a floppy diskette, and/or available via the Internet.

Figure 1:
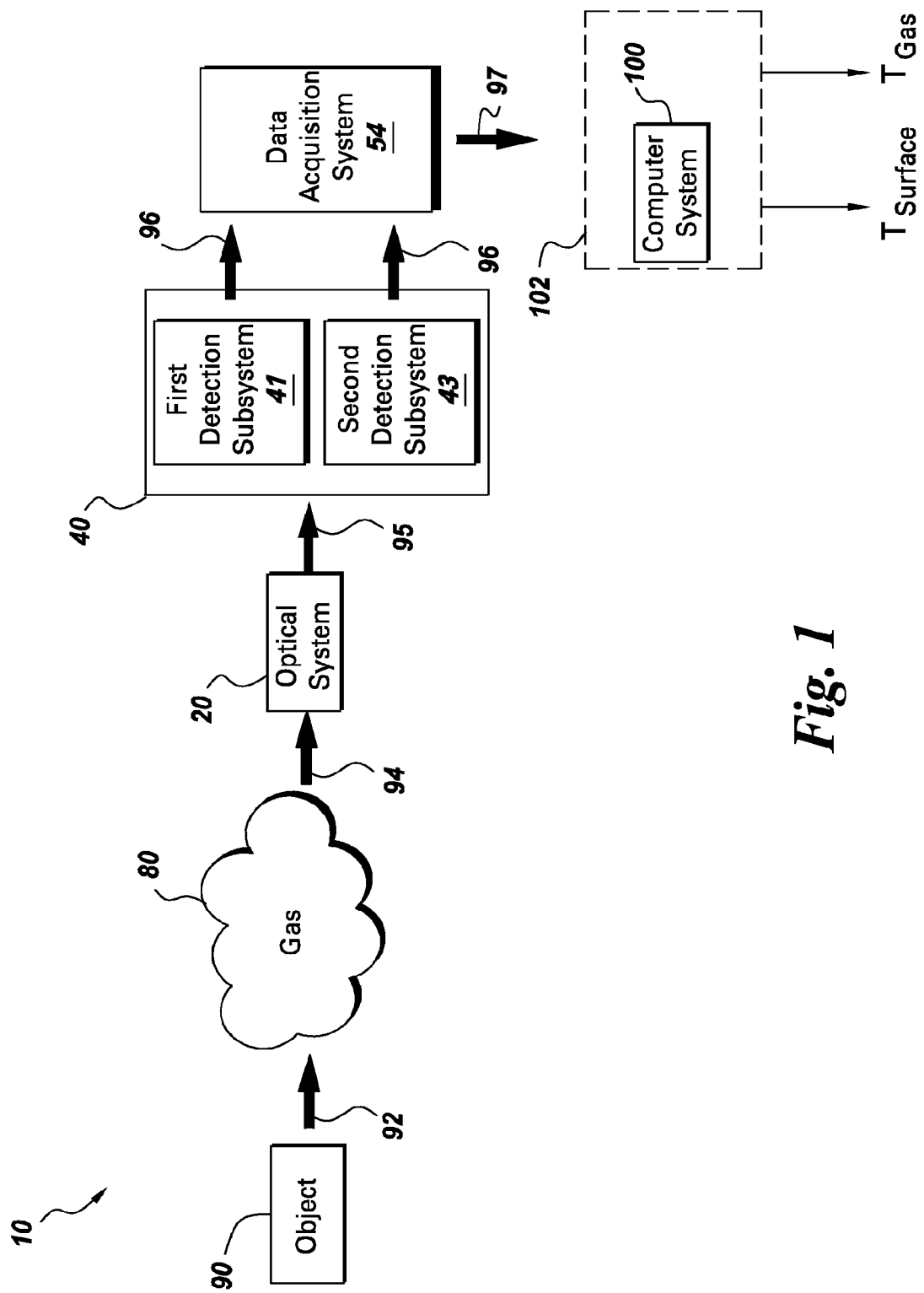
FIG. 1 is a block diagram of a multiwavelength thermometer according to an embodiment of the present invention.

Turning now to the drawings, FIG. 1 is a block diagram representation of a thermal measurement system, or system, 10, in accordance with embodiments of the invention. The system 10 includes an object 90 emitting light 92. The light 92 passes through a gas, or gasses, 80 towards the system 10. The emitted light 92 passes through the gas 80 and the light 94 is collected by an optical system 20. From the optical system 20, the light is transmitting to a detector system 40, at 95. The detector system 40 may comprise a first detector subsystem 41 and a second detection subsystem 43. Embodiments of detector system 40, which will be described in detail below with reference to FIGS. 3A through 3C, emits a calibrated analog signal 96. The calibrated analog signal 96 further passes through a data acquisition system 54, that may comprise an analog to digital (A/D) conditioner, which outputs a digital signal 97. The A/D conditioner 54 may be further configured to improve the signal quality. The digital signal 97 is finally input to a computer system 100, in a computer infrastructure 102, that processes the signal 97 and outputs emissivity spectrum and temperature of the object 90 and/or the gas 80. For example, the computer system 100 is configured to process the signal using an algorithm to provide the temperature of the gas 80. Depending on the embodiment, element 95 may comprise at least one of a prism, a lens, a mirror, an optical fiber cable (e.g., fiber 24 in FIGS. 3A and 3B), and combinations thereof configured to provide light transmission between the optical system 20 and the detector system 40.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

The thermal measurement system 10 may be employed to measure temperature of gas 80 and/or a surface of the object 90 in a variety of environments. By example and not limitation, the object 90 may be virtually any stationary or moving object, or some combination thereof. For example, the stationary object may be any one, or more than one, hot gas path components of a gas turbine, such as the combustion liner, a turbine nozzle, a turbine stator, a turbine afterburner, and the like. Similarly, examples of moving objects may be any traversing or rotating objects typically in harsh environments. Examples of rotating objects may be turbine blades. Examples of traversing objects may be pistons. Clearly, the object 90 that the thermal measurement system 10 may be used to measure temperature(s) may be an object other than the exemplary embodiments listed herein. Aspects of the invention provide advantages for measuring temperatures in harsh environments (e.g., high temperatures). The system 10 may measure temperatures wherein the temperature of the surface of the object 90 is in a range of about 500° F. to about 3000° F. and/or where a temperature of the gas 80 is in a range of about 500° F. to about 4000° F.

Similarly, the thermal measurement system 10 may be employed to measure temperature of a variety of gases 80. In a typical combustion environment, the system 10 may be used where the gas 80 is, for example, carbon dioxide ($CO_2$), steam ($H_2O$), a hydrocarbon (e.g., natural gas, vaporized jet fuel, diesel gas, etc.), or some combination thereof. Other types of gases may be measured, as well by the system 10. Similarly, the thermal measurement system 10 may be employed in a variety of pressurized environments. For example, the pressure of the environment (e.g., combustion chamber) in which the gas 80 is present may be at least about 3 atmospheres in some embodiments, or at least about 5 atmospheres in other embodiments, and the like. In other embodiments, the pressure may at atmospheric pressure, under vacuum, and the like.

Figure 2A:
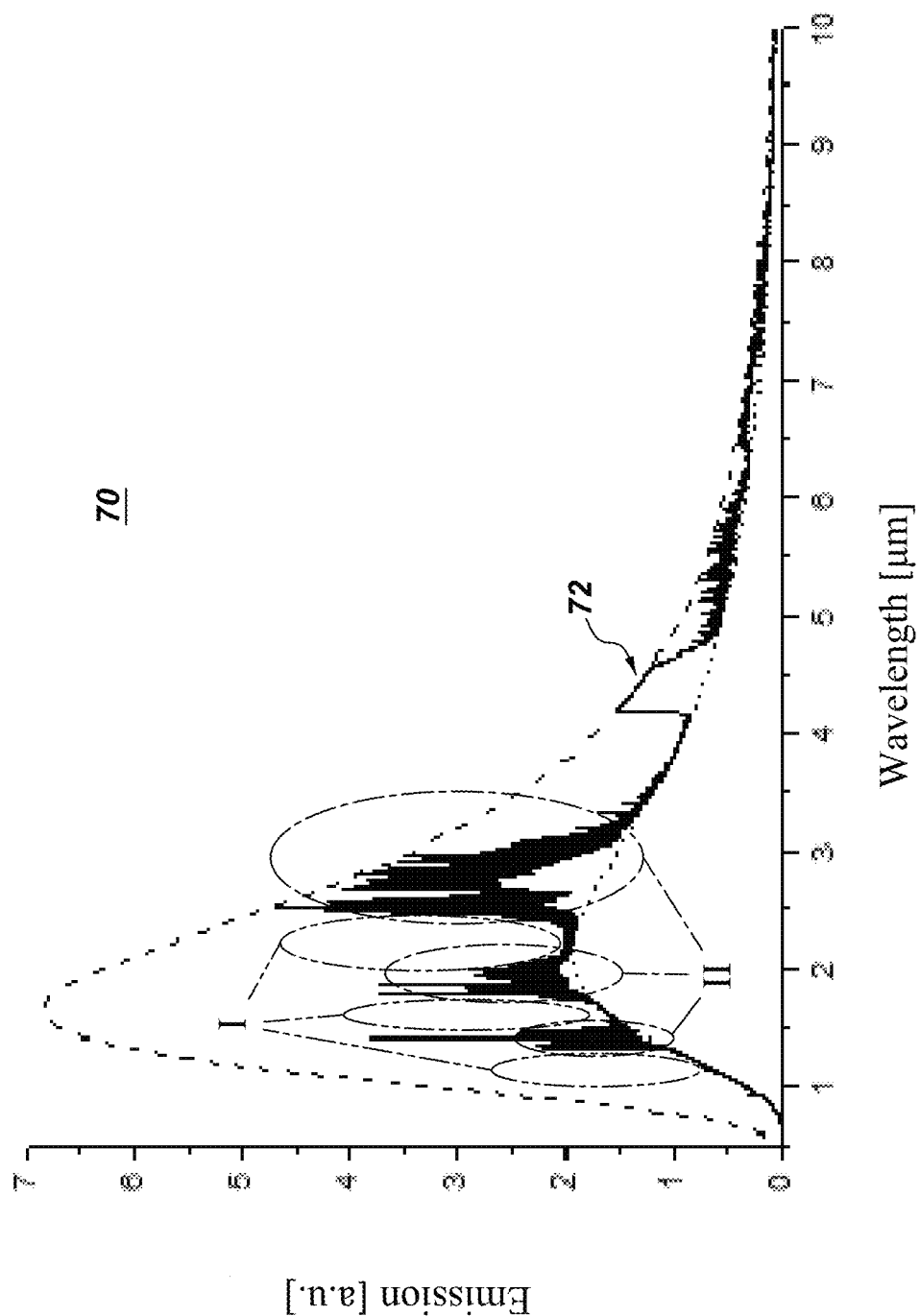
FIG. 2A is an emission vs. wavelength curve employed by embodiments of the present invention.

FIG. 2A illustrates a curve 70 that depicts emission of light as compared to wavelength for light as it passes from an object 90 through a gas 80 (See e.g., FIG. 1). Aspects of the present invention employ information on the curve 70. As the curve 70 shows, light at certain wavelengths, or intensities, passes through the gas 80 with minimum (e.g., little or no) absorption and emission by the gas 80. Some of these regions (i.e., regions of minimal gas absorption/emission) are depicted by Roman numeral I in FIG. 2A. Similarly, light at certain wavelengths, or intensities, passes through the gas 80 and is substantially absorbed and emitted by the gas 80. Some of these regions (i.e., regions with substantial gas absorption/emission) are depicted by Roman numeral II in FIG. 2A.

Figure 2B:
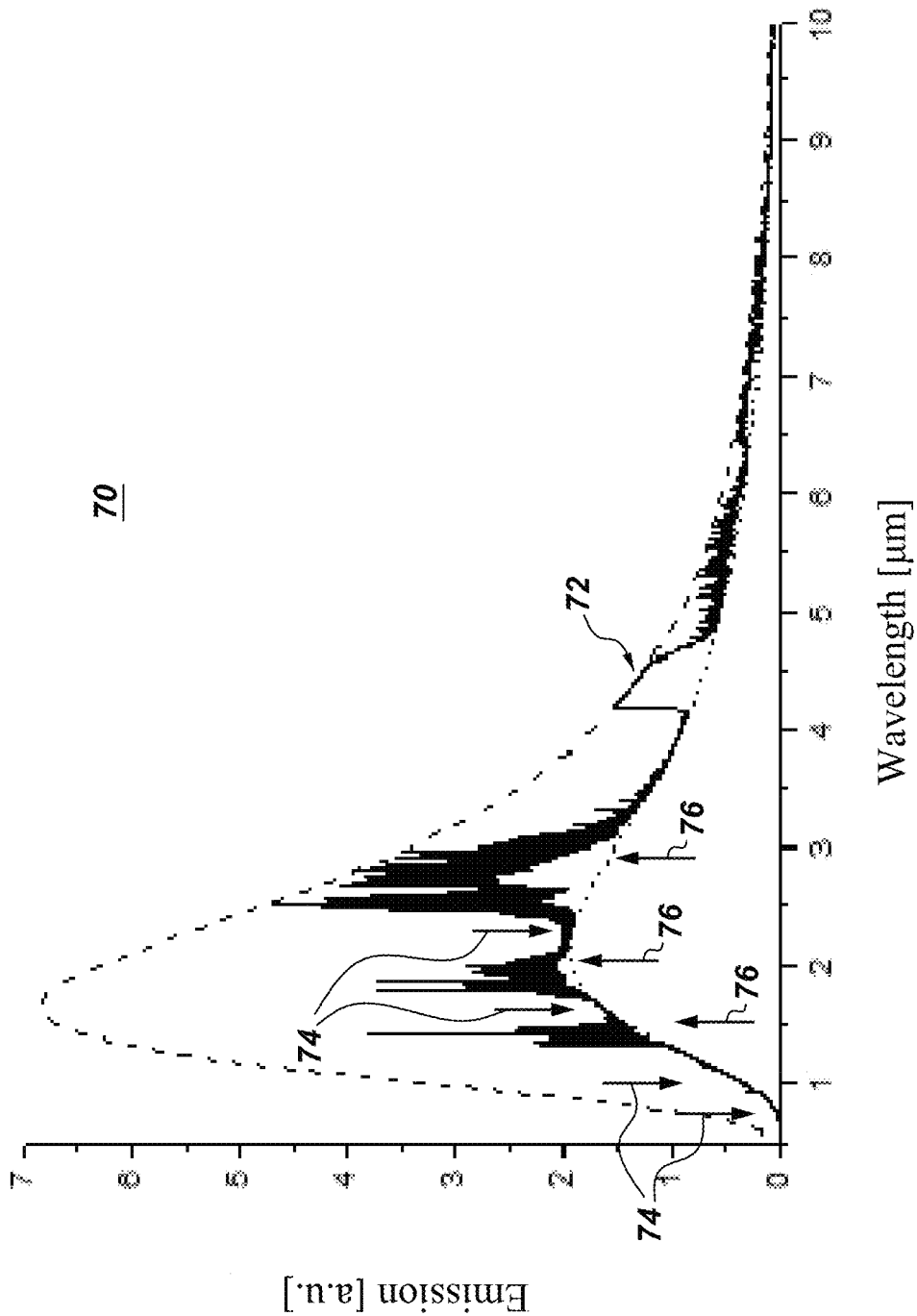
FIG. 2B is an emission vs. wavelength curve employed by embodiments of the present invention.

Additionally, at wavelengths from about 4 μm to about 5 μm, depicted as 72 in FIGS. 2A and 2B, gas 80 emits and absorbs light that may be detected in the wavelength range in particular embodiments.

FIG. 2B illustrates a curve 70 that depicts the emission of light as compared to wavelength. Aspects of the present invention employ information on the curve 70. The system 10 collects and uses light (e.g., from surface of object 90 and/or absorbed and emitted by gas 80) that may have a wavelength from about 0.5 μm to about 10 μm. As shown in the embodiment, depending on the particular gas, or gases, 80 (see e.g., FIG. 1) detectors 76 are used in the system 10 that have detection ranges that align with at least one of the regions demarked II (FIG. 2A). Three arrows, depicted as 76, are illustrating wavelengths, or wavelength ranges, where three (3) detectors may be used that detect light substantially absorbed and emitted by the particular gas 80. Similarly, depending on the particular gas, or gasses, 80, detectors 74 are used in the system 10 that have detection ranges that align with at least one of the regions demarked I (FIG. 2A). Four arrows, depicted as 74, are illustrating wavelengths, or wavelength ranges, where four (4) detectors may be used that detect light minimally absorbed and emitted by the particular gas 80. Clearly, other configurations and quantities of detection points 74, 76 may be employed in the invention. Thus, one or more detectors may be selected, under aspects of the present invention, that has a particular detection wavelength (or range) that corresponds to where gas substantially absorbs and emits light (e.g., termed as a "gas" detector(s)). Similarly, one or more detectors may be selected, under aspects of the present invention, that has a particular detection wavelength (or range) that corresponds to where gas minimally absorbs and emits light (e.g., termed as a "object" detector(s)). In this manner, the system 10 (FIG. 1) is able to collect light and ultimately measure the temperature of the gas 80 and/or the temperature of the object 90.

Figure 3A:
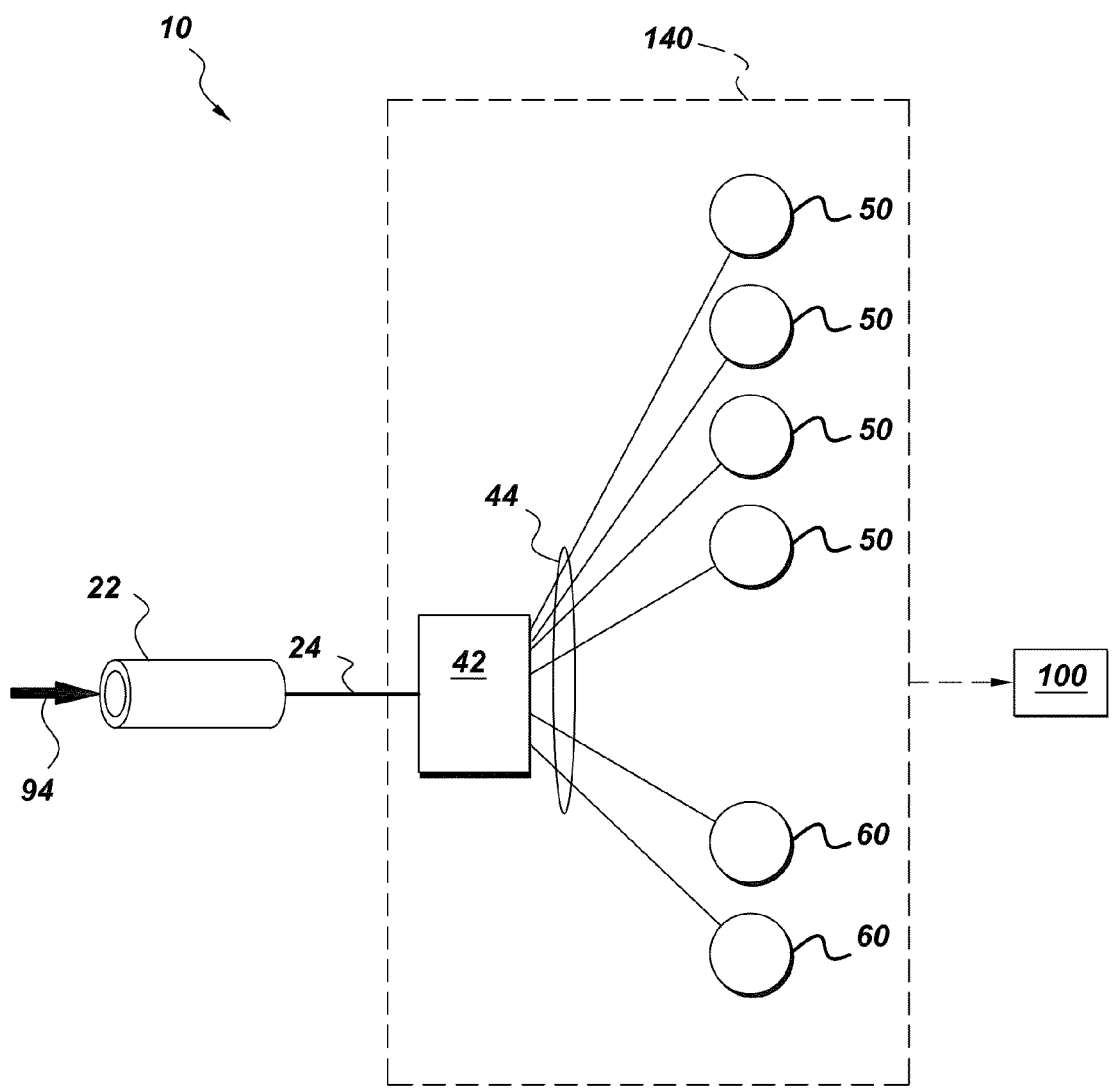
FIGS. 3A-3C are schematic diagrams of an optical system and detection system of a multiwavelength thermometer according to various embodiments of the present invention.

FIG. 3A illustrates an exemplary configuration of the optical system 20 and detection system 40, as referenced in FIG. 1. The gas 80 has absorbed and emits light 94 towards the optical system 20. Portions of the light 94 (i.e., particular wavelengths) are from the surface of the object 90 unimpeded (i.e., not absorbed and emitting by gas 80). Similarly, portions of the light 94 (i.e., particular wavelengths) are emitted from the surface of the object 90, but are absorbed and emitted by gas 80. In any event, light 94 is collected by the optical system 20 and then passes through the detector system 140. In this particular embodiment, the detection system 140 includes a demultiplexer 42, or similar device, connected, or in light communication, via optical fiber 44 with a plurality of detectors. The demultiplexer 42 effectively splits the light collected by the optical system 20 into separate wavelengths. The detectors comprise at least one object detector 50 and at least one gas detector 60. The optical system 20 may comprise for example a light collection device 22 connected via fiber 24 with the detection system 40. The object detector 50 may comprise a single, a plurality, or an array of suitable detectors. Similarly, gas detector 60 may comprise a single, a plurality, or an array of suitable detectors. Although a configuration of four object detectors 50 and two gas detectors 60 is shown in FIG. 3A, clearly other configurations are contemplated under aspects of the present invention. The detection system 140 is connected to the computer system 100. Referring to both FIGS. 2 and 3A, the demultiplexer 42 may be configured (e.g., sized) so as to split the light received by the optical system 20 into one or more portions, or ranges, of the emission curve (FIGS. 2A and 2B) so that at least a portion of the light is from the regions labeled 74 and at least a portion of the light is from the regions labeled I (FIG. 2A). For example, as shown in FIG. 3A, the demultiplexer 42 may split the light into six (6) different wavelengths, or wavelength ranges, such that four different object detectors 50 and two different gas detectors 60 are configured to detect light at different points along the emission curve. In this manner, the gas detectors 60 and demultiplexer 42 are configured so that the gas detectors 60 are detecting light in the region(s) II (FIG. 2A) where the particular gas(es) 80 absorb and emit light. Similarly, the object detectors 50 and demultiplexer 42 are configured so that the object detectors 50 are detecting light in the regions 74 where the particular gas(es) 80 absorb and/or emit substantially no light when the light 92 (FIG. 1) from the surface of the object 90 passes therethrough. In this manner, the detection system 40 is able to detect multiple wavelengths of light that correspond to both light emitted from the surface of the object 90 and light absorbed and/or emitted by the gas 80. From the information provided by the light detected by the detection system 140, the system 10 is able to measure temperature of the gas 80 and/or temperature of the surface of the object 90. In another embodiment the demultiplexer 42 and gas detectors 60 may be further configured so that light in the range 72 (i.e., about 4 μm to about 5 μm) are detected.

Figure 3B:
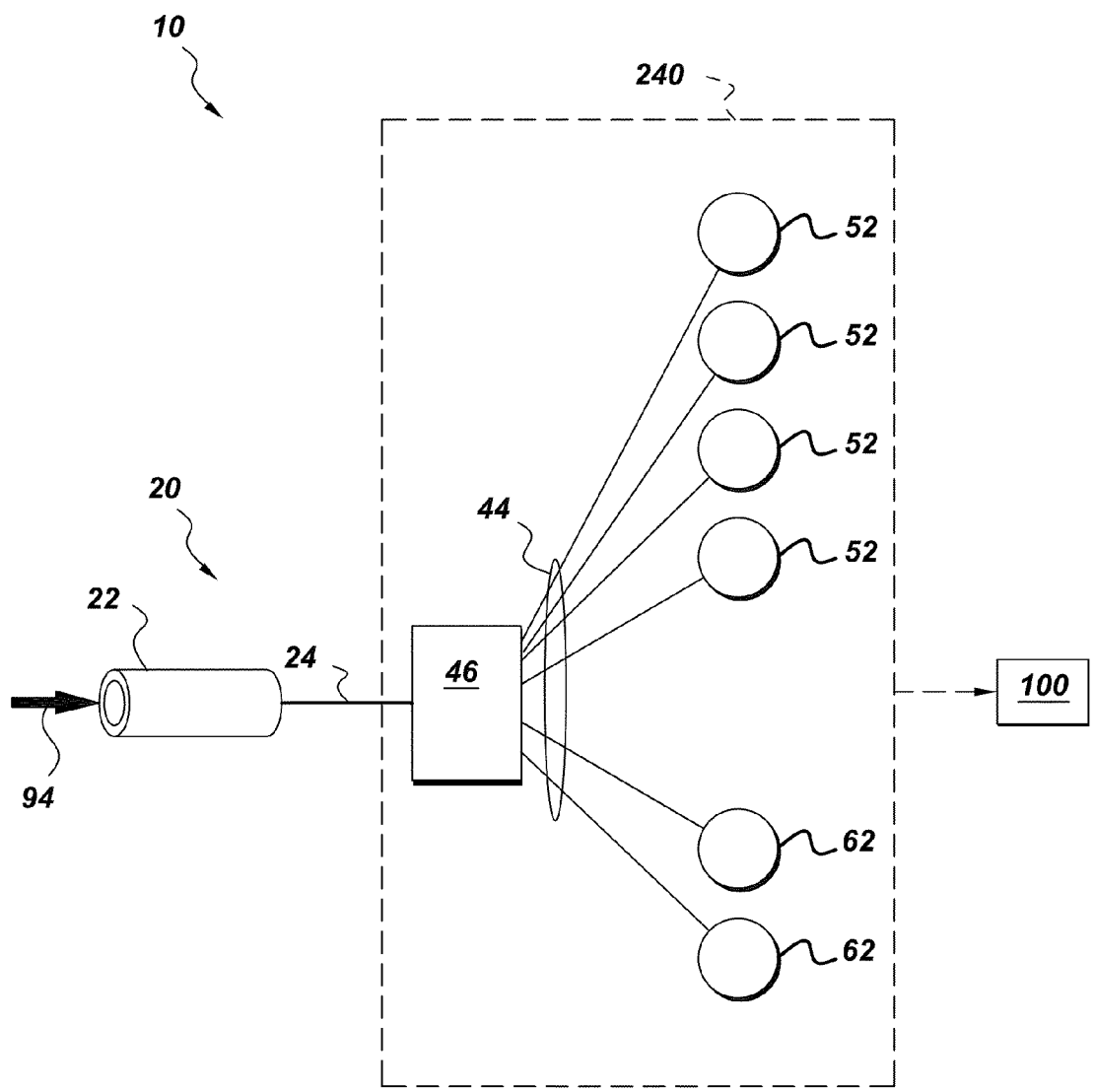

FIG. 3B illustrates another exemplary configuration of the optical system 20 and detection system 40, as referenced in FIG. 1. The gas 80 has absorbed and emits light at certain wavelengths (or ranges) from the light 92 emitted from the surface of the object 90. Similarly, certain wavelengths of light emitted from the surface of the object 90 arrive minimally impeded by the gas 80. In either event, light 94 passes through the optical system 20. Light 94 is collected by the optical system 20 and then passes through the detector system 240. In this particular embodiment, the detection system 240 includes a light separator 46 (e.g., beam splitter, etc.) connected, or in light communication, via suitable means (e.g., optical fiber) 44 with a plurality of detectors. The light separator 46 effectively splits the light collected by the optical system 20 into separate paths of light. The detectors comprise at least one object detector 52 and at least one gas detector 62, wherein the object detector 52 and gas detector 62 include a bandpass filter. The optical system 20 may comprise for example a light collection device 22 connected via fiber 24 with the detection system 40. The object detector 52 may comprise a single, a plurality, or an array of suitable detectors. Similarly, gas detector 62 may comprise a single, a plurality, or an array of suitable detectors. Although a configuration of four object detectors 52 and two gas detectors 62 is shown in FIG. 3B, clearly other configurations are contemplated under aspects of the present invention. The detection system 240 is connected to the computer system 100. Referring to both FIGS. 2A, 2B, and 3B, while the light separator 46 is configured to split the received light into multiple paths of light all having the same wavelengths, the bandpass filters of each of the object detector 52 and gas detector 62 are configured (e.g., sized) so as to detect light by the optical system 20 from a particular portion, or range, of the emission curve (FIGS. 2A, 2B) so that at least a portion of the light is from the region(s) labeled I (FIG. 2A) and at least a portion of the light is from the regions labeled II (FIG. 2A). For example, as shown in FIG. 3B, the bandpass filters of the six detectors 52, 62 are configured (e.g., sized), such that four different object detectors 52 and two different gas detectors 62 are configured to detect light at different points along the emission curve (FIGS. 2A, 2B). In this manner, the gas detectors 62 with their respective bandpass filters are configured so that the gas detectors 62 are detecting light in the regions II where the particular gas(es) 80 absorb and emit light at some wavelengths. Similarly, the object detectors 52 and their respective bandpass filters are configured so that the object detectors 52 are detecting light in the regions I (FIG. 2A) where the particular gas(es) 80 absorb and/or emit minimal, or no, light when the light 92 (FIG. 1) from the surface of the object 90 passes therethrough. In this manner, the detection system 240 is able to detect multiple wavelengths of light that correspond to both light emitted from the surface of the object 90 unimpeded and light absorbed and/or emitted by the gas 80. From the information provided by the light detected by the detection system 240, the system 10 is able to measure temperature of the gas 80 and/or temperature of the surface of the object 90. In another embodiment a gas detectors 62 and its corresponding bandpass filter may be further configured so that light in the range 72 (i.e., about 4 µm to about 5 µm) is detected.

Figure 8:
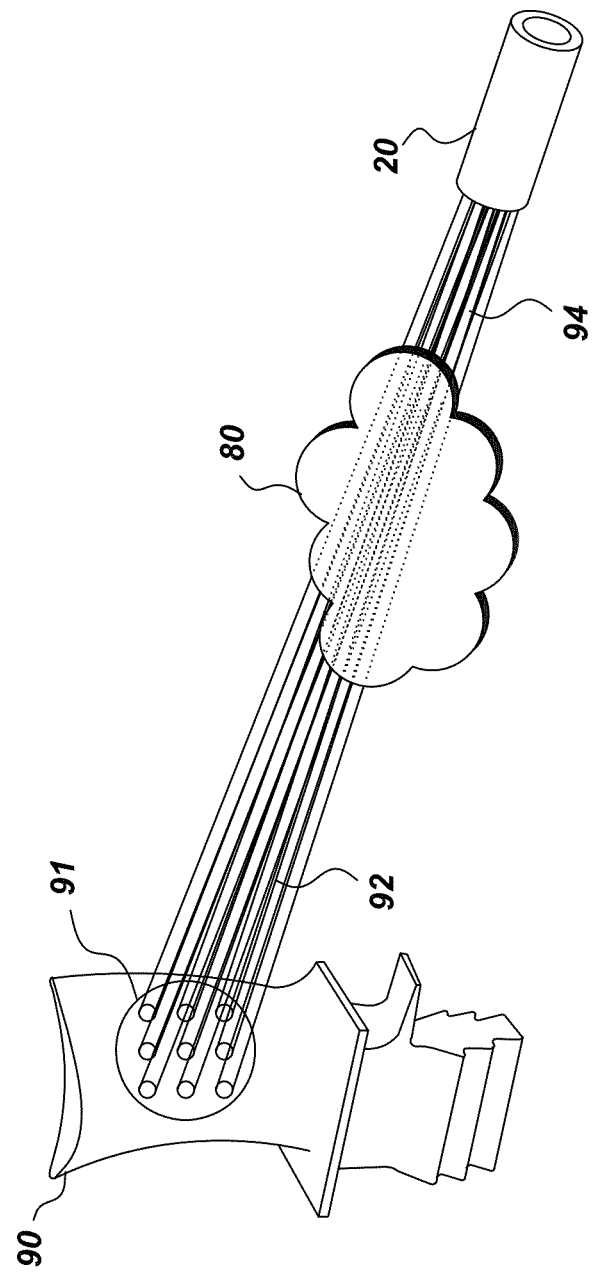
FIG. 8 is a perspective view of a two-dimensional array optical system portion of an embodiment of the present invention.

Various embodiments of an optical system 20 and detection system 40 may be used with the present invention. Light is collected from the gas absorption/emission and/or light from the surface of the object in a variety of ways. In an embodiment, light is collected from a single point 91 on the surface of the object (i.e., single point embodiment), as depicted in FIG. 6. In another embodiment, light is collected from along a one-dimensional array on the surface of the object (i.e., 1-D embodiment), as depicted in FIG. 7. In still another embodiment, light may be collected from along a two-dimensional array on the surface of the object (i.e., 2-D embodiment, as depicted in FIG. 8. In the single point embodiment (FIG. 6), light may be collected by a single passive light collector such that light is collected along a single axis through the gas 80 to a single point 91 on the surface of the object 90. In the 1D embodiment (FIG. 7), light may collected in a similar way as that depicted in FIGS. 3A and 3B in that light is collected form multiple points 91 (e.g., from five points) on the surface of the object 90. For example, if light is collected at five locations along the surface of the object 90, then, referring to FIGS. 3A and 3B, six (6) detectors 50, 60 or 52, 62 times the quantity of measured locations are required. Thus, a total of thirty (30) detectors 50, 60 or 52, 62 may be employed to measure light from the object 90 and gas 80. Regardless of whether a demultiplexer 42 with detectors 50, 60 or a light separator 46 with detectors with bandpass filters 52, 63 is employed, a quantity of M×N total detectors may be used. M is defined as how many points, or locations, that light is collected from the object 90 and gas 80. N is defined as how many wavelengths, or wavelength ranges of light, from curve 70 that are detected at each single point.

Figure 3C:
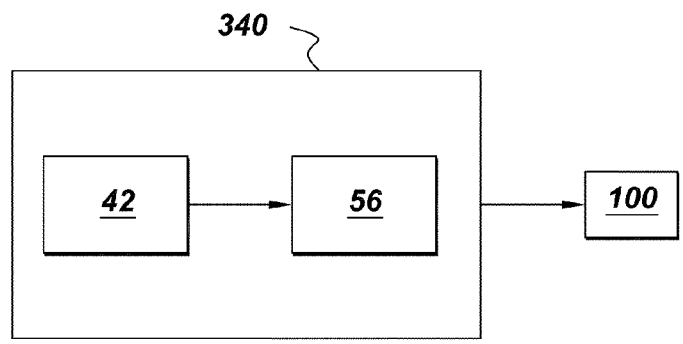

Referring to FIG. 3C, another embodiment of detection system 340 that uses a camera 56 may be employed. Although more practical for the 1D and 2D embodiments, the embodiment may be used in the single point embodiment. As shown, a demultiplexer 42 is in communication with at least one camera 56 as part of detection system 340. The detection system 340 having detecting light at particular wavelengths communicates with the computer system 100. In an embodiment, a plurality of cameras 56 may be used wherein each camera 56 is configured to measure light at one wavelength, or wavelength range. In another embodiment, the light is divided into several regions, where each region is configured to measure light at one wavelength, or wavelength range.

In this manner, light is collected in a variety of configurations so that temperature is concomitantly measured in a variety of configurations. For example, in the single point configuration, temperatures are measured at a single point 91 on a surface of the object 90 and along a single axis through the gas 80 (See e.g., FIG. 6). In the 1D configuration, temperatures are measured at M points 91 on a surface of the object 90 and along M axes through the gas 80 (See e.g., FIG. 7). In the 2D configuration, temperatures are measured at T points 91 on a surface of the object 90 and along T axes through the gas 80 (See e.g., FIG. 8).

In another embodiment, the system 10 may be configured such that only light is collected that is emitted and absorbed by the gas 80. In this embodiment, light that has no, or minimal, gas absorption is ignored and/or not measured. Gas temperature is still provided in this embodiment. In this embodiment, the surface temperature of the object 90 may be received by other means. For example, the surface temperature of the object 90 may be provided from spectroscopic parameters 138 stored in storage system 118 (See FIG. 5). Alternatively, the temperature of the surface of the object 90 is known and/or calculated by other means.

Figure 4:
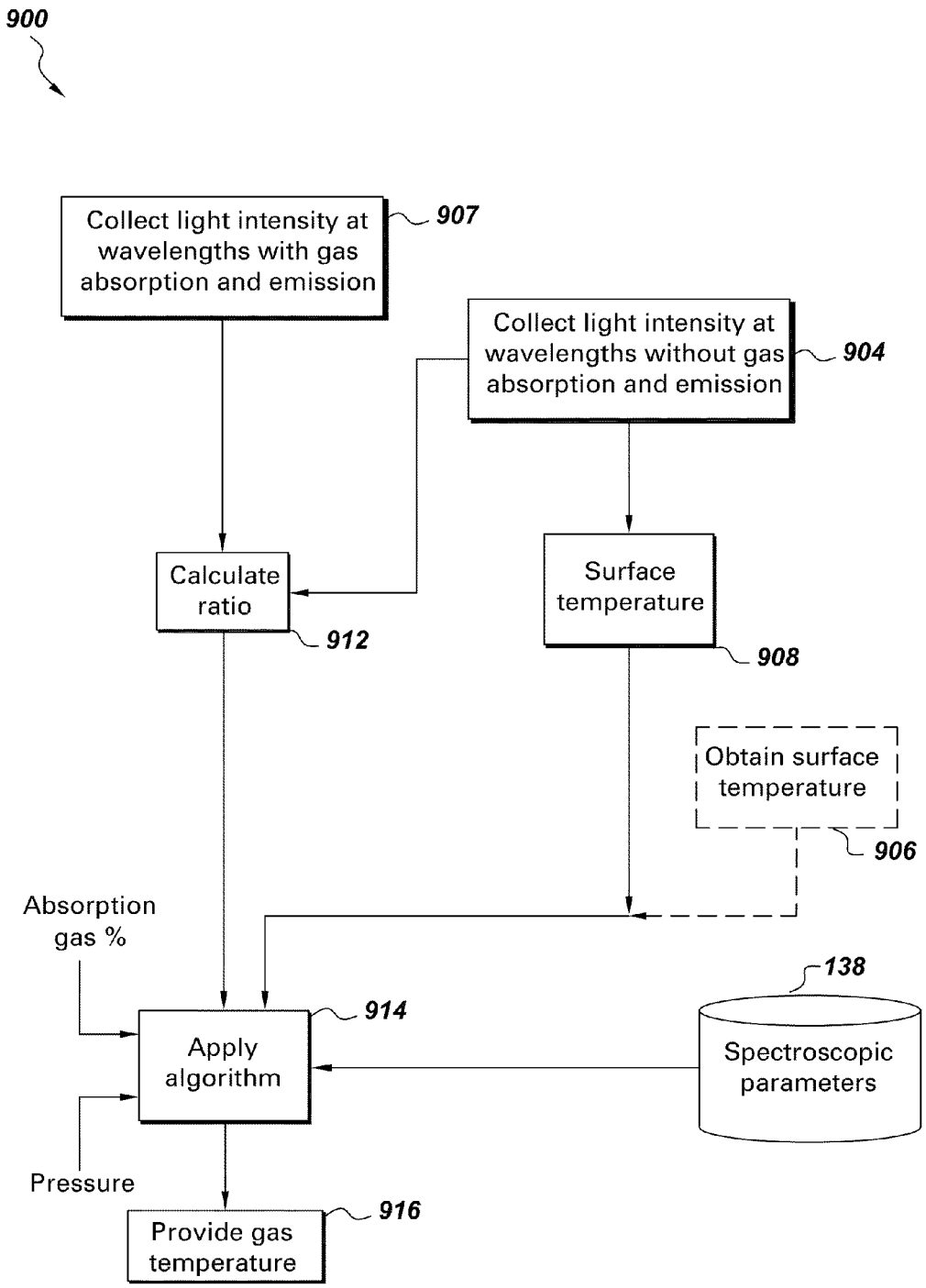
FIG. 4 is a flowchart of a passive absorption method according to an embodiment of the present invention.

Referring to FIG. 4, an embodiment of method of passive absorption spectroscopy is depicted. The method 900, which may be conducted by computer system 100 (FIG. 5), comprises collecting light intensity at a wavelength(s), or wavelength range(s), where the gas 80, or gasses, substantially absorb and emit light, at 907. At 904, the method comprises collecting light intensity at a wavelength(s), or wavelength range(s), where the gas 80, or gasses, absorb and emit minimal, or no, light. From the collection of light at 904 and 907, the ratio is calculated at 912, where the ratio is a function of surface temperature, gas temperatures, pressure, and/or gas composition. At 908, the surface temperature of object 90 is determined. As discussed above, alternatively at 906 the surface temperature may be obtained or received by other means (e.g., spectroscopic parameters 138, etc.). An interpolation algorithm is applied at 914 by the interpolation engine 130 (FIG. 5) to the calculated ratio and the surface temperature. At 916, the temperature of the gas is provided.

Figure 5:
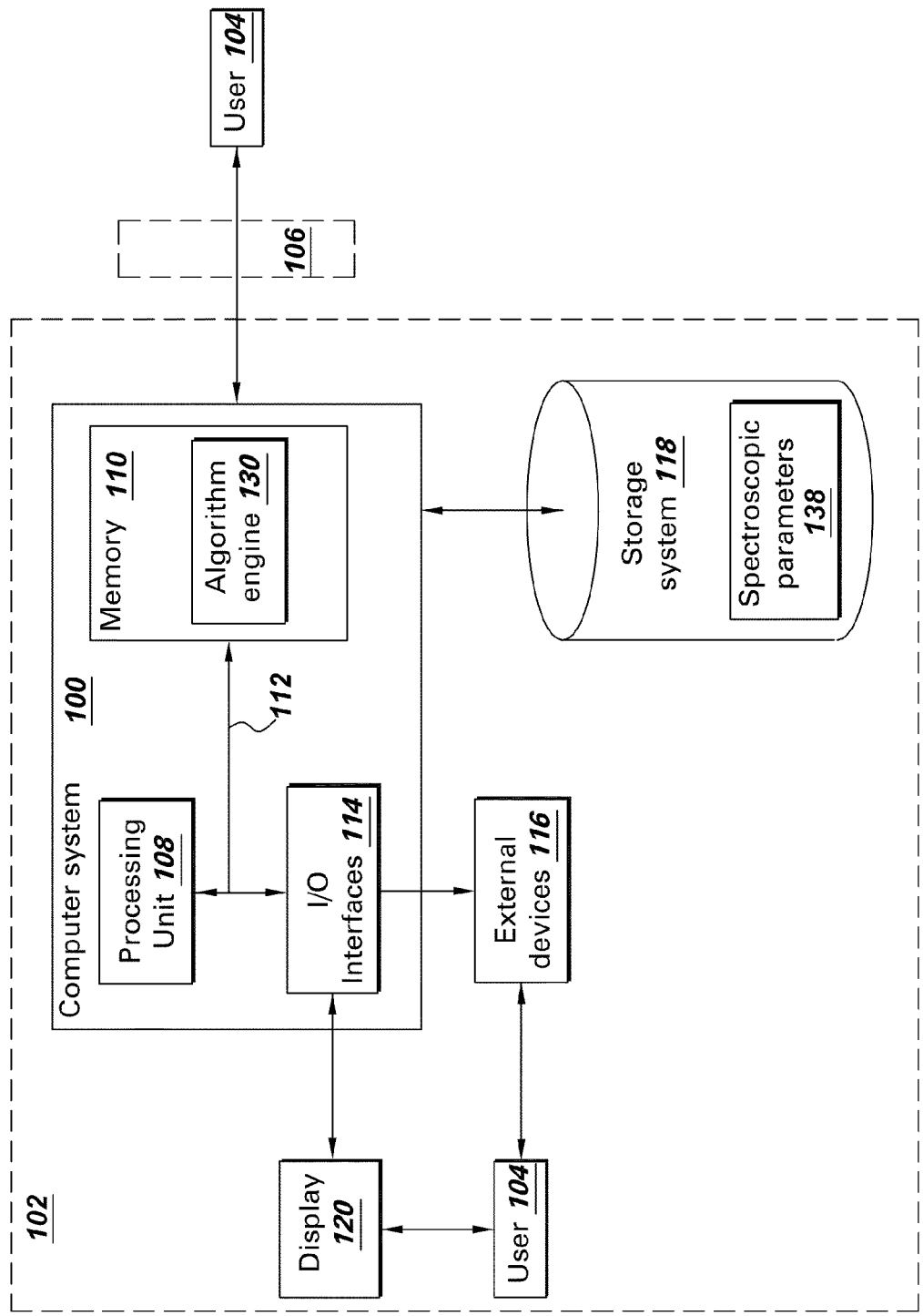
FIG. 5 is schematic diagram of a computer system of an embodiment of the present invention.

A computer system 100 for measuring temperatures in accordance with an embodiment of the present invention is depicted in FIG. 5. Computer system 100 is provided in a computer infrastructure 102. Computer system 100 is intended to represent any type of computer system capable of carrying out the teaching of the present invention. For example, computer system 100 may be a laptop computer, a desktop computer, a workstation, a handheld device, a server, a cluster of computers, and the like. In addition, as will be further described herein, computer system 100 can be deployed and/or operated by a service provider that provides a service for measuring temperatures in accordance with an aspect of the present invention. It should be appreciated that a user 104 can access computer system 100 directly, or can operate a computer system that communicates with computer system 100 over a network 106 (e.g., the Internet, a wide area network (WAN), a local area network (LAND), a virtual private network (VPN), etc.). In the case of the latter, communications between computer system 100 and a user-operated computer system can occur via any combination of various types of communication links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as algorithm engine 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 110. External devices/resources 116 may comprise any devices (e.g., keyboard, pointing device, display (e.g., display 120, printer, etc.) that enable a user to interact with computer system 110 and/or any devices (e.g., network card, modem, etc.) that enable computer system 100 to communicate with one or more other computing devices.

Computer infrastructure 102 is only illustrative of various types of computer infrastructures that may be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems than can be used in the practice of the present invention, each of which can include numerous combinations of hardware/software. For example, processing unit 108 can comprise a single processing unit, or can be distributed across one or more processing units in one or more locations e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 5 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable or providing storage for information under the present invention. Such information can include, for example, spectroscopic parameters 138, etc. Spectroscopic parameters 138 may include, for example, at least one temperature of the surface of the object 90 previously calculated and/or previously obtained; pressure, gas composition, absorption gas percentage, and the like. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 may contain computerized components similar to those described above with regard to computer system 100.

Shown in memory 110 (e.g., as a computer program product) is an algorithm engine 130 for providing temperatures in accordance with embodiment(s) of the present invention. The algorithm engine 130 may, for example, provide temperature of the gas 80 (See e.g., FIG. 1) and/or the surface of the object 90 (See e.g., FIG. 1).

The present invention can be offered as a business method on a subscription or fee basis. For example, one or more components of the present invention can be created, maintained, supported, and/or deployed by a service provider that offers the functions described herein for customers. That is, a service provider can be used to provide a service for measuring temperature, as described above.

It should also be understood that the present invention can be realized in hardware, software, propagated signal, or any combination thereof. Any kind of computer/servicer system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In an embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Therefore, according to one embodiment of the present invention a thermal measurement system comprises a light collection device; a detection system in communication with the light collection device, the detection system comprising a first detection subsystem and a second detection subsystem, wherein the first detection subsystem is configured to detect light from a surface of an object, further wherein the second detection subsystem is configured to detect light from the surface and a gas.

In accordance with another aspect of the invention, a thermal measurement system comprises a light collection device; and a detection system in communication with the light collection device, wherein the detection system is configured to detect light intensity from a gas.

In accordance with another aspect of the invention, a method of directly measuring temperatures comprises collecting light through a gas from a surface of an object; one of receiving and measuring a temperature of the surface of the object; and measuring a temperature of the gas, based on the collected light and the temperature of the surface of the object.

In accordance with another aspect of the invention, a method of directly measuring a temperature comprises collecting light from a gas; and measuring the temperature of the gas, based on the collected light.

In accordance with another aspect of the invention, a computer program product stored on a computer readable medium for measuring temperatures, the computer readable medium comprising program code for performing the steps of: collecting light through a gas from a surface of an object; one of receiving and measuring a temperature of a surface of an object; and measuring a temperature of the gas, based on the light and the temperature.

In accordance with another aspect of the invention, a method of deploying an application for measuring temperatures, comprises: providing a computer infrastructure being operable to: collect light through a gas from a surface of an object; one of receive and measure a temperature of a surface of an object; and measure a temperature of the gas, based on the light and the temperature.

The present invention has been described in terms of the preferred embodiment, and it is recognized that equivalents, alternatives, and modifications, aside from those expressly stated, are possible and within the scope of the appending claims.

What is claimed is:

1. A thermal measurement system comprising:
   an optical system configured to collect light emitted from a surface of an object and emitted from a gas;
   a detection system configured to receive the light collected by the optical system, the detection system comprising a first detection subsystem and a second detection subsystem, wherein the first detection subsystem is configured to detect the light emitted from the surface of the object, further wherein the second detection subsystem is configured to detect the light emitted from the surface of the object and the gas, wherein at least one of: a detection range of the first detection subsystem is configured to minimize emission and absorption of the gas; and
   a detection range of the second detection subsystem is configured to substantially match at least one wavelength range where the gas absorbs and emits light.

2. The thermal measurement system of claim 1, wherein the thermal measurement system is configured to measure a temperature of the surface of the object and the gas at substantially a same time.

3. The thermal measurement system of claim 1, wherein a temperature of the surface is between about 500° F. and about 3000° F.; and, a temperature of the gas is between about 500° F. and about 4000° F.

4. The thermal measurement system of claim 1, wherein the gas comprises one of $CO_2$, $H_2O$, a hydrocarbon fuel, and combinations thereof.

5. The thermal measurement system of claim 1, wherein the optical system is configured to receive light from one of: a single point of the surface, a plurality of points in a one dimensional array of the surface, and a plurality of points in a two dimensional array of the surface.

6. The thermal measurement system of claim 1, further comprising at least one of a prism, a lens, a mirror, an optical fiber cable, and combinations thereof configured to provide light transmission between the optical system and the detection system.

7. The thermal measurement system of claim 1, wherein a wavelength of the light collected by the optical system is between about 0.5 μm and about 10 μm.

8. The thermal measurement system of claim 7, further wherein the wavelength of the light collected by the optical system is between about 4.0 μm and about 5.0 μm.

9. The thermal measurement system of claim 1, the detection system further comprises one of:
   a de-multiplexer in communication with the first detection subsystem and the second detection subsystem; and
   a light separator in communication with the first detection subsystem and the second detection subsystem, wherein the first detection subsystem and the second detection subsystem further include a dichroic mirror or a bandpass filter.

10. The thermal measurement system of claim 9, wherein the detection system comprises at least one of:
    a single detector, a plurality of detectors, an array of detectors, and a camera.

11. The thermal measurement system of claim 1, wherein the object is one of a moving object, a stationary object, and combinations thereof.

12. The thermal measurement system of claim 11, wherein the stationary object is at least one hot gas path component of a gas turbine.

13. The thermal measurement system of claim 12, wherein the hot gas path component is one of a combustion liner, a turbine nozzle, a turbine stator, and a turbine afterburner.

14. The thermal measurement system of claim 11, wherein the moving object is one of a rotating object and a traversing object.

15. The thermal measurement system of claim 14, wherein the rotating object is a turbine blade.

* * * * *